(12) United States Patent
Alappat

(10) Patent No.: US 10,879,730 B2
(45) Date of Patent: Dec. 29, 2020

(54) POWER SUPPLY

(71) Applicant: Intel Corporation, Santa Clara, CA (US)

(72) Inventor: Kuriappan Alappat, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 809 days.

(21) Appl. No.: 14/954,828

(22) Filed: Nov. 30, 2015

(65) Prior Publication Data

US 2016/0087489 A1 Mar. 24, 2016

Related U.S. Application Data

(63) Continuation of application No. 12/887,502, filed on Sep. 21, 2010, now Pat. No. 9,203,265.

(51) Int. Cl.
*H02J 9/06* (2006.01)
*H02J 7/00* (2006.01)
*H02J 7/34* (2006.01)

(52) U.S. Cl.
CPC .......... *H02J 9/061* (2013.01); *H02J 7/0068* (2013.01); *H02J 7/0077* (2013.01); *H02J 7/345* (2013.01)

(58) Field of Classification Search
CPC ........ H02J 9/061; H02J 7/0077; H02J 7/0068; H02J 7/345; Y10T 307/625
See application file for complete search history.

(56) References Cited

U.S. PATENT DOCUMENTS

| 8,044,536 | B2 | 10/2011 | Nguyen et al. | |
|---|---|---|---|---|
| 2003/0052645 | A1* | 3/2003 | Sasaki | H02J 7/0063 320/110 |
| 2003/0169022 | A1 | 9/2003 | Turner et al. | |
| 2005/0110468 | A1 | 5/2005 | Turner et al. | |
| 2007/0018502 | A1* | 1/2007 | Bazinet | H02M 1/10 307/80 |
| 2007/0040449 | A1* | 2/2007 | Spurlin | A61M 5/1723 307/64 |
| 2008/0088997 | A1* | 4/2008 | So | H02H 9/025 361/93.7 |
| 2008/0088998 | A1 | 4/2008 | So | |
| 2008/0111423 | A1 | 5/2008 | Baker et al. | |
| 2009/0033286 | A1 | 2/2009 | Rosa et al. | |
| 2010/0148580 | A1 | 6/2010 | Taniuchi | |
| 2010/0257529 | A1 | 10/2010 | Wilkerson et al. | |

(Continued)

FOREIGN PATENT DOCUMENTS

CN 101789620 7/2010
KR 10-0868609 B1 11/2008

(Continued)

OTHER PUBLICATIONS

Final Office Action for U.S. Appl. 12/887,502 dated May 5, 2015, 12 pages.

(Continued)

*Primary Examiner* — Daniel J Cavallari
(74) *Attorney, Agent, or Firm* — Green, Howard, & Mughal LLP

(57) ABSTRACT

Provided is a platform with backup power and burst load power needs met using a supercapacitor.

7 Claims, 1 Drawing Sheet

(56) References Cited

U.S. PATENT DOCUMENTS

2011/0121656 A1* 5/2011 Hicks .................. H02J 1/00
307/80

FOREIGN PATENT DOCUMENTS

| TW | 200828006 A | 7/2008 |
|---|---|---|
| WO | 2012039945 A1 | 3/2012 |

OTHER PUBLICATIONS

International Preliminary Report on Patentability for PCT/US2011/050799 dated Apr. 4, 2013, 8 pages.
Non-Final Office Action for U.S. Appl. No. 12/887,502 dated Mar. 6, 2013, 12 pages.
Notice of Allowance for U.S. Appl. No. 12/887,502 dated Jul. 29, 2015, 7 pages.
Notice of Allowance for Taiwan Patent Application No. 100132991 dated Oct. 18, 2016, 3 pages.
Office Action for Taiwan Patent Application No. 100132991 dated Jul. 22, 2015.
International Search Report and Written Opinion for International Patent Application No. PCT/US2011/050799, dated Feb. 27, 2012, 9 pages.
MFI Electronics, "Benefits of Supercaps in Handheld Devices," retrieved on Sep. 3, 2015 via http://mfi-electronics.com/2013/11/16/benefits-of-supercaps-in-handheld-devices, Nov. 16, 2013, 6 pages.
Kongats, A., "Prismatic Supercapacitor Applications," CAP XX, Ltd., Apr. 17, 2013, 29 pages.
Translation of Search Report for Taiwan Patent Application No. 100132991, dated Mar. 17, 2016.
Notice of Grant from Taiwan Patent Application No. 105137879 notified Mar. 5, 2018, 3 pgs.

\* cited by examiner

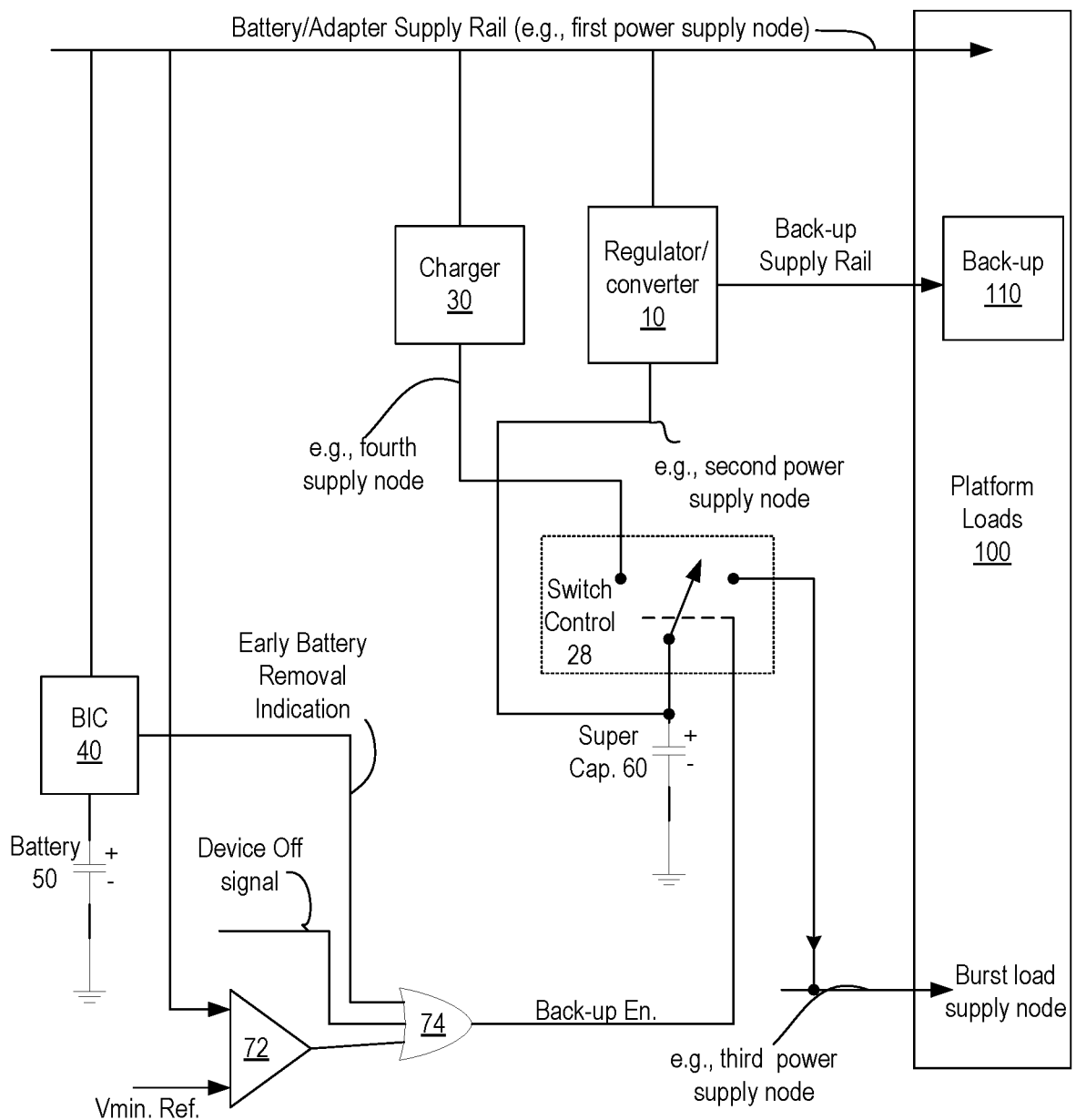

POWER SUPPLY

CLAIM FOR PRIORITY

This application is a continuation of U.S. patent application Ser. No. 12/887,502, filed on 21 Sep. 2010, titled "POWER SUPPLY," issued as U.S. Pat. No. 9,203,265 on 1 Dec. 2015, and which is incorporated herein by reference in its entirety for all purposes.

TECHNICAL FIELD

The present invention relates generally to power supplies and in particular, to supplying power to mobile systems using a battery and/or DC adapter.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is a power delivery diagram of a computing platform with a super capacitor for providing current during burst loads in accordance with some embodiments.

DETAILED DESCRIPTION

System burst currents are increasing beyond the capability of batteries used in today's mobile devices. In addition to the traditional wireless communication (e.g., GSM) burst loads, other platform features, e.g., application and graphics processors with burst or overdrive modes, high power integrated hands free (IHF) audio speakers, and additional radios, to mention just a few, may also draw burst loads. New use cases involving multiple display streams, active radios, graphics overlay and concurrent applications will also increase burst loads.

A suggested approach for solving this problem is to use a larger capacity battery or additional batteries. Unfortunately, this approach may have prohibitive impacts on the cost and size of a device. Accordingly, new approaches are desired.

In mobile devices, a super capacitor may often be used to provide backup supply, e.g., for a platform's real time clock (RTC) circuit in two situations, namely, when the main battery is disconnected (say, during battery replacement or due to mechanical shock) and when the main battery is discharged to such a low level, it is unable to power the RTC circuit. It has been appreciated by the inventor that during most of the usage, whether the device is in an off, standby, or an active state, the RTC supercap is not doing anything useful. Embodiments disclosed herein provide for a single, low-resistance supercap to be used for both applications, i.e., providing a backup (e.g., RTC) power supply and providing a supplemental supply available for burst load operations. During normal usage, the supercap may be coupled to a supply rail needing higher burst load capability (e.g., at least one supply rail for IHF Audio amplifiers, GSM RF Tx amplifiers, etc.) On the other hand, when appropriate, it may supply power to a backup supply rail during at least times when the primary supply (e.g., battery) is either unavailable or too low. In addition to reducing cost and size impact, this approach may have an additional advantage that one can run burst applications when connected to an external DC source. (This is because the supercap in some embodiments will be able to supply the burst currents while the DC adapter supplies steady state current. (For example, conventional smartphones typically do not support GSM operation when powered from an external DC source as it usually cannot supply burst loads.) The present approach may also be used to filter supply induced audio noise caused by burst events.

FIG. 1 shows a portion of a computing platform with burst mode supply capability in accordance with some embodiments. It includes a back-up voltage regulator 10, a switch control circuit 20, a charger 30, a battery interface connector (BIC) 40, a battery 50, a supercap 60, a comparator 72, and an OR gate 74, coupled as shown, to provide power to platform load 100. The platform load 100 corresponds to components within a computing platform such as a mobile phone, mobile computer such as a netbook, tablet, or notebook PC, or any other portable electronic device. (Note that the depicted power supply components are part of the platform device but are shown apart from a generic platform "load" block to illustrate pertinent features of the invention.

The platform load 100 may comprise several different components such as a processor chip, display, peripheral components, and the like. It may comprise back-up load components 110, which are shown for illustrative purposes. The back-up load may comprise any circuits or circuit blocks that are desired to have continuous (or suitably continuous) power, even when the battery or other primary power source is not available. Such circuits could include volatile memory, RTC circuitry, and the like. The back-up load is coupled to the back-up supply rail, but it may also be coupled to the battery or other supply rails. Likewise, the burst load supply rail may be coupled to components within the platform load block that are also coupled to other supply rails.

The load 100 receives power from a battery/adapter supply rail and normally (when the battery is present and sufficiently charged) is coupled to the supercap 60 through switch circuit 20 for additional power when needed. Under normal conditions, the supercap provides power to the burst mode supply rail, but when the battery is missing, deficient, or when the platform is turned off, it is switched to the charger 30. In the depicted embodiment, it is continuously coupled to a back-up load 110 (e.g., RTC chip or other loads to be provided power even when the battery is not available) by way of the backup supply rail through the back-up VR 10. Note, however, in alternative embodiments, the backup load rail could be coupled to the supercap through a switch that couples it when the battery is deficient, or otherwise not available, although the switch, and logic controlling the switch, would likely have to be suitably powered, e.g., they could be part of the backup load.

The supercap 60 may be implemented with any suitable capacitor having sufficiently high capacitance, and at the same time, having sufficiently low effective series resistance (ESR) to be able to provide suitable current over a sufficient duration for a burst load event. For example, a suitable supercap may have tens or hundreds of milli-Farads capacitance with an ESR in the tens or hundreds of mill-Ohms and be capable of sourcing, for example, one to two Amps at a source voltage around 3 V, e.g., for up to two to three mill-Seconds.

During normal usage i.e. when the battery or AC adapter supply rail has a sufficient voltage level and the device is not in OFF state, the supercap 60 is coupled by the switch circuit 20 to the burst load supply rail thereby improving its burst load handling capability and reducing voltage droop at the load caused by the burst loads. The capacitance value is selected to keep the burst load supply rail within specification during the duration of the burst load. In between burst loads, the supercap gets charged from the burst load supply rail, which normally will be coupled to the primary power source supply rail. When the device is OFF or battery or AC adapter supply rail is below the operating voltage level (including not plugged in, say during battery replacement), the supercap is connected to the charger 30 by the switch circuit 20. The charger could be a simple constant current charger. It may also limit initial inrush current to the supercap when a fully charged battery is inserted. The supercap is charged from the Burst Load Supply rail in between bursts during normal operation. Voltage droop across the supercap during the bursts is low and hence no separate charge current limiting circuit is needed. At the same time, the backup supply voltage regulator will be powered from either the adapter/battery (primary source) supply rail or Supercap whichever is higher. (Note that in some embodiments, the charger and/or backup VR could be omitted, depending on particular design considerations.)

On battery removal, the early battery removal indication signal (which may be part of some platforms) asserts at an OR gate 74 input, which causes the switch circuit 20 to channel the supercap to the charger 30. (For example, the Advance Battery Removal Indication signal, used in some platforms, could be used for the EBRI signal). Similarly, with this embodiment, if the device if turned off, the supercap is switched to the charger 30. Along the same lines, if the battery discharges so that its supply voltage drops below a Vminref level (for example, if a 3 V battery dropped to below 1.5 V), then the comparator 72 asserts, which causes the OR gate to assert and channel the supercap through the switch circuit 20 to the charger 30. Thus, when the battery voltage drops below a level where burst applications or system operation are not possible (or when burst applications are not active), the supercap is switched to the charger 30. The backup load 110 may work at voltages lower than the nominal battery supply, e.g., as low as 1.5 V. Therefore, even when a device is shutdown due to low battery voltage, the battery 50 may still have enough capacity to power the backup circuit and charge the supercap.

The switch control circuit 20 may also incorporates circuitry to control the supercap charging current, e.g., to make sure that it is not charged too rapidly. In addition, in some embodiments, some or most of the circuit elements of FIG. 1 could be implemented in a power management integrated circuit (PMIC), which may be used in many different computing platforms. They could alternatively be implemented external to a PMIC.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
   a first power supply node coupled to a battery;
   a second power supply node coupled to a super capacitor;
   a third power supply node coupled to a load;
   a switch operable to couple the second power supply node to the third power supply node;
   circuitry to control the switch such that the switch couples the second power supply node to the third power supply node when a supply from the battery falls below a threshold; and
   a voltage regulator coupled to the switch, wherein the switch is coupled to the third power supply node, and wherein the super capacitor includes a node which is to receive power by the battery.

2. The apparatus of claim 1, wherein the second power supply node coupled to an audio amplifier.

3. The apparatus of claim 1, wherein the second power supply node coupled to an RF Transmitter Amplifier.

4. The apparatus of claim 1, wherein the load is one of a memory or a real-time clock (RTC) circuit.

5. An apparatus, comprising:
   a first power supply node coupled to a battery;
   a second power supply node coupled to a super capacitor;
   a third power supply node coupled to a load;
   a switch to couple one of the first or second power supply nodes to the third power supply node;
   circuitry to control the switch such that the switch couples the second power supply node to the third power supply node when a supply from the battery falls below a threshold; and
   a voltage regulation circuitry connected to the switch, wherein the switch is coupled to the third power supply node.

6. The apparatus of claim 5, wherein the circuitry to control the switch comprises logic to control the switch.

7. The apparatus of claim 5, wherein the super capacitor includes a node which is to receive power by the battery.

* * * * *